C. W. McKIBBEN.
METHOD OF SEPARATING ASSOCIATED LIQUIDS.
APPLICATION FILED DEC. 14, 1917.
1,299,589.
Patented Apr. 8, 1919.
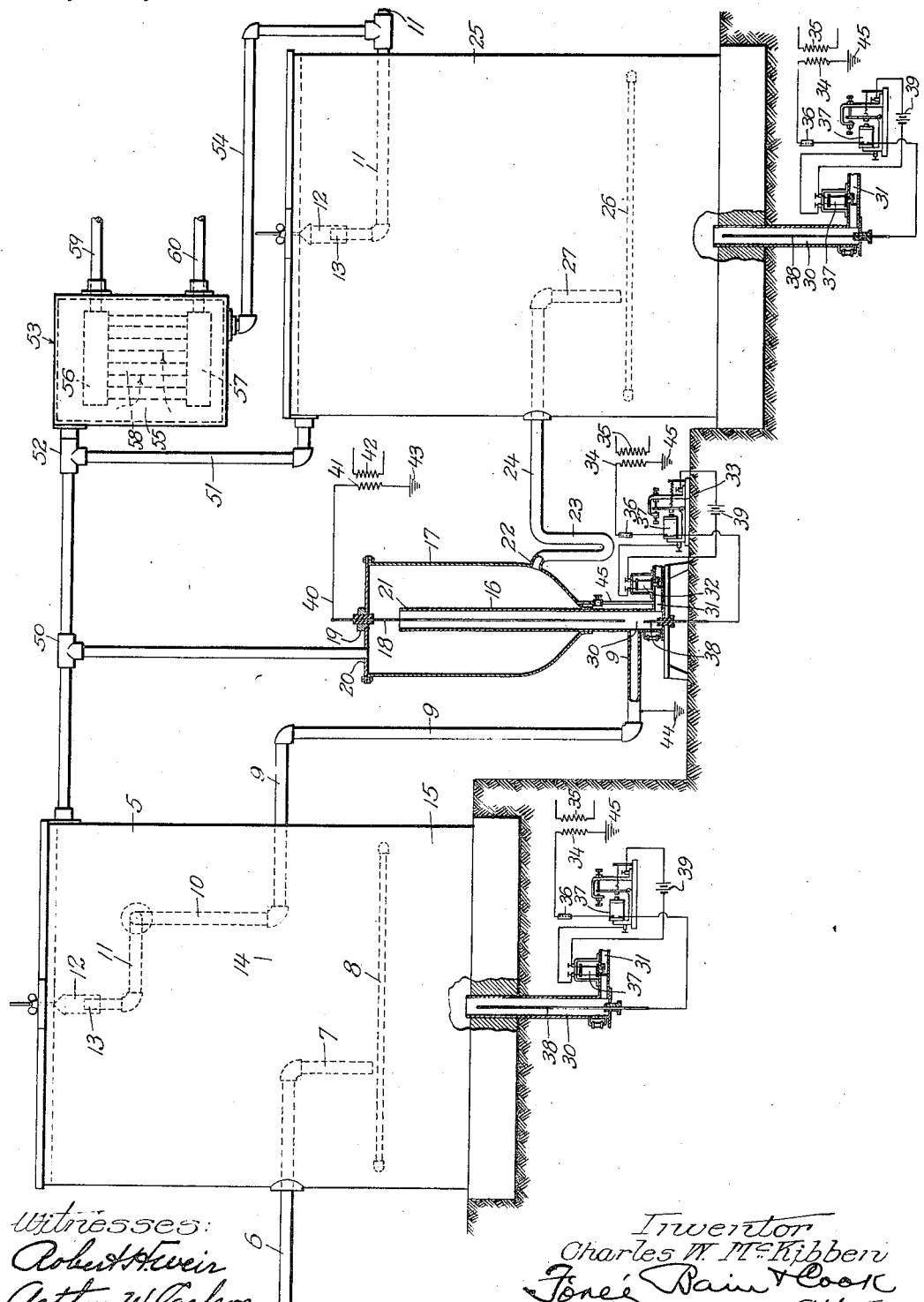

UNITED STATES PATENT OFFICE.

CHARLES W. McKIBBEN, OF HOUSTON, TEXAS.

METHOD OF SEPARATING ASSOCIATED LIQUIDS.

1,299,589.  Specification of Letters Patent.  Patented Apr. 8, 1919.

Application filed December 14, 1917. Serial No. 207,174.

*To all whom it may concern:*

Be it known that I, CHARLES W. McKIBBEN, a citizen of the United States, residing at Houston, in the county of Harris and State of Texas, have invented certain new and useful Improvements in Methods of Separating Associated Liquids, of which the following is a specification.

My invention relates to the art of separating associated liquids, in which particles of one liquid are held, or bound in mechanical suspension in another, as in emulsions. It is especially applicable for the treatment of liquids differing in specific gravity and specific electrical conductivity, such for example, as crude petroleum and water.

One of the objects of my invention is to provide a process of separation of entrapped water from oil, which is continuous, rapid, economical and efficient.

Another object is to provide an electrical mode of operation for automatically discharging the free precipitated water, from the emulsion, or that which has become free and separated from the oil, by utilizing the differences in electrical conductivity and specific gravity of the liquids.

Other and further objects of my invention will become readily apparent to persons skilled in the art, from a consideration of the following description when taken in conjunction with the drawings, wherein is shown a schematic representation of apparatus, closed conduits and receptacles by which my invention may be carried into effect.

The physical properties of heat cause mutual repulsion of the molecules of a liquid when heated, thus diminishing the force of their cohesion, decreasing the viscosity of the liquid and increasing its mobility.

The particles, or molecules constituting water and oil, are each subject to this effect by increase of temperature. When water and oil, such as petroleum, are associated as an emulsion, when heated, the expansion effect tends to attenuate the walls of oil intervening between adjoining water globules and to decrease their surface tension. Therefore, when the emulsion is preliminarily heated it is a most propitious time to apply electricity to further the effect or to complete the destruction of the oil envelops or films that imprison the myriads of small particles of water, or so deplete them that they can no longer segregate the many particles of water against their mutual tendency to cohere, but yield to the mutual attraction thereof, which results in the coalescing of the many smaller particles into larger globules of free water.

In the practice of my method of separation I preferably heat the emulsion in a pressure tight receptacle to a temperature that best suits the particular emulsion, which may vary from 135 to 180 Fahrenheit. The only pressure needed is enough to force the fluid through the apparatus which could be anything needed, possibly 20 pounds more or less. I then pass the emulsion through an intense electrical field produced by about 10,000 volts, more or less as the characteristics of the emulsion vary, preferably, alternating current, and, preferably, in a vertical direction, so that part of the freed water may settle by effect of gravity into a chamber below the body of the emulsion. Because of the great velocity through the treater some of this freed water passes on through to the settling tank with the oil and there most of the water drops out.

While I prefer the use of alternating current for the purpose, it will be manifest to persons skilled in the art that constant potential direct current may be used.

As the emulsion passes through the treating conduit, it is subjected to the action of a strong electric field which produces polarization of the water globules or particles, increasing their affinity and causing them to approach each other by mutual attraction whereupon the oil is pressed out from between the globules causing the inclosing walls to become thinner. The resistance of the normally interposed oil, being relatively larger than that of the entrapped water, the electric current, which inherently will select the path of least resistance, will flow through those globules of water where the intervening walls of oil are thinner, thus intensifying the polarization of the particles along the aforesaid path which further reduces the resistance, by further attenuating the walls, through the tendency of the particles or globules to cohere or re-unite into drops or larger bodies of water until the vigorous upward movement of the stream of liquid and said electrical effect, causes rupture of the inclosing oil filaments, surrounding the small particles of water, liberating them, whereupon their mutual attraction causes them to cohere into relatively large globules or bodies and some of the freed water gravitates to the bottom of the upwardly moving body of emulsion out of its path and into the settling chamber therebelow, but some of the freed water, on account of the high velocity of the moving liquids is carried over into the settling tank.

In the settling chamber, in which the liberated water is contained, I provide electrodes between which electric current, preferably maintained at constant potential, is to be passed. When the resistance between the electrodes has been reduced by an increased quantity of water, due to the settling of the water from the emulsion and the displacement of the emulsion thereby, from said chamber, the effect will be to operate a current responsive device that automatically opens a valve in a discharge pipe leading from the settling chamber, permitting the water to be discharged. As the oil, or emulsion, follows the discharged water into the settling chamber the resistance between the electrodes becomes greater, by the interposition of the emulsion, whereupon the current is thereby reduced and the relay, being consequently substantially deënergized, the valve is automatically closed. By this means the freed water is prevented from accumulating and is readily and quickly disposed of.

In the accompanying drawings I have shown a series of closed tanks, conduits and other containers that may advantageously be employed for carrying my invention into effect.

5 is a pressure tight storage tank for containing emulsion to be treated, which is pumped into the tank through a pipe 6 having a downturned end 7, just above a steam heating coil 8, in which the steam may be superheated. A discharge pipe 9 is provided with an upwardly extending part 10 and a laterally extending end 11 having a gas trap cup 12 over the upper end 13 to prevent the gases that may be contained in the upper part of the tank, from escaping through the discharge pipe 9. There is an opening from pipe 10 into the tank, controlled by the valve 14. Freed, or entrained water will settle in the bottom part 15 of the tank. The pipe 9 has a free opening into a vertically disposed conduit or pipe 16 of the treater. The upper part of the pipe 16 is surrounded by a relatively large casing 17. An electric conductor, comprising a metallic rod 18, is supported in the center of the conduit 16 by an insulating support 19 that is fixed to the top 20 of the treater. The oil coming from the pipe 9 will flow upwardly, at a relatively high velocity in the conduit 16 of the treater, between the same and the electric conductor 18 and overflow at the top 21 into the casing 17. A discharge opening 22 is provided above the bottom of the casing 17 and contains a goose neck trap 23. The pipe 24 conducts the relatively pure oil from the treater into a closed oil storage tank 25. A heating coil 26 preferably for superheated steam, is contained also in the oil storage tank 25, and the incoming oil from the treater 17 passes through the pipe 27 immediately above the heating coil. The object of putting the heating coil 26 in the oil tank 25 is to maintain the oil at a relatively high temperature to encourage the further separation of any entrapped or free water, that may be carried over through the treater into the oil storage tank, by the coalescence of the globules and precipitation to the bottom of the tank.

The emulsion treater 17 is fully described and claimed in an application Serial No. 203,695 filed by me on the 24th day of November, 1917. Briefly it consists of the parts described, with a settling chamber 30 below the bottom of the inlet to the vertical pipe 16 and a discharge pipe 31 leading therefrom controlled by a valve operated by an electro-magnet 32. A relay 33 is in circuit with a secondary coil 34 of the transformer which is in inductive relation with the primary coil 35 thereof and which, through an adjustable resistance 36, is in circuit with the relay coil 37, and with a centrally disposed conductor 38 that projects into the settling chamber 30. The electromagnet 32, controlling the valve in the discharge pipe 31, is energized by a source of current which may be a battery 39 or other source.

The centrally disposed conductor 18 in the conduit 16 is connected by a wire 40 to the secondary circuit 41 of the transformer which is in inductive relation with a primary coil 42. The secondary coil is grounded, as at 43, and the pipe 9 is grounded, as at 44. The secondary coil 34 of the transformer 35 is grounded, as at 45.

In the operation of the apparatus the oil will pass from the pressure tank 5, heated as heretofore described and under pressure, and through the pipe 9 into the conduit 16 of the treater between the inner wall of the conduit and the centrally disposed, vertically extended conductor 18, through an intense electrical field produced by practically 10,000 volts, more or less, from the secondary coil 41 of the transformer. As this secondary is grounded, as at 43, and as the vertically extended conduit 16 is grounded, as at 44, the current will pass between the central conductor and the conduit 16 and produce the electric field in a manner clearly understood by persons skilled in the art.

As the emulsion passes upwardly through the pipe 16, and overflows at the end 21 of the pipe at a high velocity, the electric field may be made unusually strong, and since the diameter of the conduit 16 is relatively small the space between the inner surface of the conduit and the central conductor 18 will be correspondingly small. Therefore, a very heavy current is permissible with a relatively low voltage because the upward movement of the emulsion through the conduit will tend to break up the chain of water globules that may be formed by the polarizing effect of the current, without danger of short circuiting, because there is constantly being formed, or tending to formation, series of chains of polarized water globules during the upward movement of the emulsion and these chains of polarized globules are as rapidly being broken asunder or disrupted by the energetic movement of the liquid through the conduit and the tenacious persistence of the polarizing effect while under treatment. As the various particles of water are liberated, they coalesce into larger globules or bodies, and are, as a result of their higher specific gravity, precipitated to the bottom of the tube 16, into the settling chamber 30 that is located in the bottom or below the pipe 9. Should some of the water liberated by this means be carried over into the chamber 17, it will settle below the outlet 22 and be conducted into the settling chamber 30 by a pipe 145.

When the resistance between the central electrodes 38 in the settling chambers 30 and the inner surface of the lower part of the chamber, constituting the boundary wall of the settling chamber, is sufficiently low, by the displacement of oil due to the accumulation of the heavier water therein, the current will then be strong enough in the relay 37 to close the local circuit, to operate the valve moving magnet 32, thereby automatically opening the valve in the discharge pipe 31, and permitting the water to flow from the settling chamber 30. As the emulsion passes into the settling chamber 30, following the discharge of the water, the electrical resistance between the central conductor 38 and the inner surface of the walls of the settling chamber, will be greatly increased, reducing the strength of the current through the relay 33 which will open the local circuit and cause the closing of the valve that governs the discharge pipe 31. By this means the water freed from the emulsion is automatically discharged.

A similar device may be placed, as shown, at the bottom of the tanks 5 and 25 so as to dispose of the accumulation of water that may settle to the bottom of these receptacles.

Owing to the narrow confines of the treater through which the emulsion passes, and the consequent relatively low resistance thereof, it is possible to increase the current to a much higher value than usual. As the treater absorbs considerable power, and is capable of treating oil that passes through it at a high velocity, this gives it a large capacity and capability to make the separation clear, clean cut and to render the operation highly efficient.

Emulsions containing petroleum oils have their own individuality or characteristics manifested in variations of viscosity, surface tension, specific gravity, tendency of cohesion, boiling point and electrical conductivity. Some of these effects may be due to the variation of the quantity of salt contained in the entrapped water, and some to other causes. To provide for adjustment that may be required, as a result of these differences, the conductor 18, in the center of the tube or conduit 16, may be adjustably raised or lowered, to vary the surfaces of confronting electrodes, requisite for the variation of the oil characteristics. By this means the device is made adjustable so as to handle emulsions that come from tanks or tank farms or oils direct from the wells, or at the refineries or other oils that are now thrown away.

To prevent the gases or vapors that may be contained in the upper parts of the various containers, from escaping, I condense them by providing a condenser 53 and connect it by pipes 50 to the upper ends of the tank 5 and the tractor 17 and by pipe 51 to the tank 25. The discharge end of the condenser is connected to the pipe 11 for the condensed vapor and purified oil. The interior cooling element within the casing 55, comprising the headers 56 and 57 and the connecting pipes 58, is to contain water at a relatively low temperature, carried thereto and taken therefrom by pipes 59 and 60. The oil in the receptacles being hot, it more freely vaporizes and this is an economical means for reclaiming it.

By using an absolutely closed system, for the treatment of the emulsions, there are no escaping gases that would increase the fire or explosion hazards or other destructive effects that may arise therefrom.

In practice, oil coming from treater into settling tank 25, is between 135 and 180 Fahr. and the gases disturbed at these temperatures readily condense and pass out through pipe 11, as commercial oil.

While I have herein shown an apparatus by which my invention may be carried into effect, it is manifest to persons skilled in the art that I am not limited to the peculiar apparatus and devices shown for the purpose, as my invention consists in the process or the steps in the process, for accomplishing the results.

Having described my invention, what I claim is:—

1. Improvements in the art of separating liquids, in which small particles of one liquid are suspended in another, one of which liquids is oil, which consists in providing a continuous uninterrupted substantially uniform electric field between electrodes uninterruptedly connected to a source of current supply, within a conduit constituting a relatively long path to polarize the water globules tending to chain formation and moving the liquid through said field at a velocity sufficient to break up or prevent persistence of chains of polarized globules of entrapped liquid between said electrodes and conducting the oil away.

2. Improvements in the art of separating liquids, in which small particles of one liquid are suspended in another, one of which liquids is oil, which consists in heating the associated liquids to a temperature below the boiling point of the mixture; providing a continuous uninterrupted substantially uniform electric field between electrodes uninterruptedly connected to a source of current supply, within a conduit constituting a relatively long path, to polarize the water globules tending to change formation and moving the liquid through said field at a velocity sufficient to prevent persistence of chains of polarized globules of entrapped liquid, between said electrodes; energizing said electrodes sufficiently to cause formation of chains of globules therebetween when the said mixture is quiescent and not in sufficient motion to break up the chain formation and conducting the oil away.

3. Steps in the art of separating liquids in which there is a difference in specific gravity and electrical conductivity which consists in providing a settling chamber for the mixture; subjecting the contents of the chamber to substantially constant electrical potential and automatically discharging the chamber of the heavier liquid upon increase of current to a predetermined degree when the heavier liquid of greater conductivity displaces the lighter one of less conductivity in said chamber.

4. Steps in the art of separating liquids in which there is a difference in specific gravity and electrical conductivity which consists in subjecting the mixture to electrical potential sufficient to polarize the globules tending to cause them to form into chains; moving the mixture with sufficient vigor or velocity to break up, or prevent the chain formations and to rupture the films inclosing the globules, thereby permitting coalescence and precipitation of the entrapped liquid; providing a chamber for the precipitated liquid in communication with and below the mixture being treated; subjecting the contents of the chamber to substantially constant electrical potential and automatically discharging the chamber of the heavier liquid upon increase of current to a predetermined degree when the heavier liquid of greater conductivity displaces the lighter one of less conductivity to a sufficient degree.

5. Improvement in the art of separating liquids in which small particles of one liquid are suspended in another, one of which liquids is oil which consists in heating the associated liquids to a temperature below the boiling point of the mixture; passing the mixture through a conduit constituting a relatively long narrow path between suitably energized electrodes, energizing said electrodes uninterruptedly and sufficiently to cause short circuit through the mixture when said mixture is not in motion; moving said liquid at a velocity sufficient to prevent the persistence of chains of polarized globules of the entrapped liquid between the electrodes, and maintaining the mixture and separated liquids in closed receptacles and conduits, during the treatment to prevent escape of gases or vapor.

In testimony whereof I hereunto set my hand in the presence of two subscribing witnesses.

CHARLES W. McKIBBEN.

In the presence of—
L. A. KOTTINTZ,
A. B. MAERCKY.